United States Patent
Jeong et al.

(10) Patent No.: US 7,545,974 B2
(45) Date of Patent: Jun. 9, 2009

(54) MULTI-LAYERED REAL-TIME STEREO MATCHING METHOD AND SYSTEM

(75) Inventors: Hong Jeong, Kyungsangbuk-do (KR); Sung Chan Park, Kyungsangbuk-do (KR)

(73) Assignee: Postech Foundation, Kyungsangbuk-Do (KR)

( * ) Notice: Subject to any disclaimer, the term of this patent is extended or adjusted under 35 U.S.C. 154(b) by 784 days.

(21) Appl. No.: 10/761,193

(22) Filed: Jan. 22, 2004

(65) Prior Publication Data

US 2004/0151380 A1    Aug. 5, 2004

(30) Foreign Application Priority Data

Jan. 30, 2003   (KR) .................... 10-2003-0006102

(51) Int. Cl.
- *G06K 9/00* (2006.01)
- *G06T 15/00* (2006.01)
- *G01C 3/14* (2006.01)

(52) U.S. Cl. .................... 382/154; 345/419; 356/12

(58) Field of Classification Search ................. 382/154
See application file for complete search history.

(56) References Cited

U.S. PATENT DOCUMENTS

| | | | | | |
|---|---|---|---|---|---|
| 5,383,013 | A | * | 1/1995 | Cox | 356/2 |
| 5,719,954 | A | * | 2/1998 | Onda | 382/154 |
| 5,825,915 | A | * | 10/1998 | Michimoto et al. | 382/154 |
| 5,867,591 | A | * | 2/1999 | Onda | 382/154 |
| 6,046,763 | A | * | 4/2000 | Roy | 348/47 |
| 6,125,198 | A | * | 9/2000 | Onda | 382/154 |
| 6,215,898 | B1 | * | 4/2001 | Woodfill et al. | 382/154 |
| 6,373,518 | B1 | * | 4/2002 | Sogawa | 348/43 |
| 2002/0012459 | A1 | * | 1/2002 | Oh | 382/154 |
| 2002/0025075 | A1 | * | 2/2002 | Jeong et al. | 382/217 |
| 2004/0228521 | A1 | * | 11/2004 | Jeong et al. | 382/154 |

* cited by examiner

*Primary Examiner*—Bhavesh M Mehta
*Assistant Examiner*—David P Rashid
(74) *Attorney, Agent, or Firm*—Bacon & Thomas, PLLC (57) ABSTRACT

In a multi-layered real-time stereo matching system with a systolic array, one scan line in one digital image of the left and the right digital image is compared with multiple scan lines in the other digital image of the left and the right digital image in real-time so that each pixel in the one scan line may be matched with a pixel in the multiple scan lines in the other digital image.

6 Claims, 5 Drawing Sheets

MULTI-LAYERED REAL-TIME STEREO MATCHING METHOD AND SYSTEM

CROSS-REFERENCE TO RELATED APPLICATIONS

This document claims priority to Korean Patent Application Number 10-2003-0006102, filed Jan. 30, 2003, the entire content of which are hereby incorporated by reference.

FIELD OF THE INVENTION

The present invention relates to a real-time stereo matching system; and, more particularly, to a multi-layered real-time stereo matching method and system using a systolic array and a method thereof, which is capable of matching a pixel in one scan line of one digital image with another pixel in multiple scan lines of another digital image to find a location and a shape of an object in a space so that the system is hardly affected by a camera installed imprecisely in location and direction thereof or a distortion of camera lens itself.

BACKGROUND OF THE INVENTION

Generally, a real-time stereo matching system employs a processor capable of implementing a stereo matching that represents a process for using a pair of two-dimensional images to obtain three-dimensional spatial information. In the real-time stereo matching system, if a scan line is equal to an epipolar line in each of two images in which two optical axes of a left and a right camera are parallel to each other, a pair of pixels which correspond to a point in the 3 dimensional space may be detected on a line of an image from the left camera (to be called a left line) and on a line of an image from the right camera (to be called right line).

A conventional processor for a fundamental of the stereo matching is disclosed in Uemsh R. Dhond and J. K. Aggarwal, Structure from Stereo—a review. IEEE Transactions on Systems, Man, and Cybernetics, 19(6): 553-572, November/December 1989. Further, a stereo matching technology for implementing the processor is disclosed in Jeong et al. (United States Patent Application Publication Number US2002/0025075 A1: Publication Date Feb. 28, 2002) "SYSTEM FOR MATCHING STEREO IMAGE IN REAL TIME".

The conventional real-time stereo matching system disclosed in Jeong et al. includes a pair of cameras, wherein two cameras have same optical characteristics. If the pair of cameras observes a spatial area, similar spatial areas are captured in respective horizontal image scan lines of the pair of cameras. Therefore, a pixel in one digital image may be matched with another pixel of the other digital image, forming a pair, such that the pair of pixels corresponds to a point in a three-dimensional space.

Based on information on the pair of the pixels and simple geometrical characteristics, it is possible to calculate respective distances from the two cameras to a point in the three-dimensional space. In this case, a disparity indicates difference between an index of a pixel in one digital image captured by one camera and that of a corresponding pixel in the other digital image captured by the other camera, and a depth represents a geometrical distance calculated from the disparity. That is, the disparity may contain information on the distance. Thus, if three-dimensional information is derived from two digital images in real-time, it is possible to obtain information on a three-dimensional distance and shape of an observed space.

In other words, in case the pair of cameras of same optical characteristics observes a same spatial area, respective horizontal image scan lines of the left and the right camera correspond to similar spatial lines. Accordingly, a pixel in one digital image may be matched with another pixel in the other digital image and the pair of pixels corresponds to a point in the three-dimensional space so that respective distances from the cameras to a point in the three dimensional space can be calculated by using geometrical characteristics of the pixels in the digital images.

A disparity indicates a distance between a location of a pixel in one digital image and that of another pixel in the other digital image, and a depth represents geometrical characteristics calculated from the disparity. In other words, the disparity can represent distance information.

However, in order to carry out the above-described stereo matching process, a consistency of an inner factor of a camera, e.g., a focal distance, and a small distortion between camera lenses of the two cameras are required. Further, two cameras should be precisely fixed on desired locations by using precise optical devices, respectively. For this, the system should be provided with very precise cameras equipped with fine maneuverability to make a precise adjustment needed, resulting in an increase in a manufacturing cost of the system.

Meanwhile, the real-time stereo matching system can be employed to function as a visual device of a robot used in industries and home electronics and also as a road recognition device of an autonomous vehicle.

However, as described above, the conventional stereo matching system commands a high manufacturing cost because of the precise cameras and precise control devices needed to make, e.g., fine adjustments, making the system bulky.

SUMMARY OF THE INVENTION

It is, therefore, an object of the present invention to provide a multi-layered real-time stereo matching method and system, which is capable of obtaining three-dimensional distance and shape information on a space observed, wherein the system is hardly affected by a camera installed imprecisely in location and direction thereof or a distortion of a camera lens even without any precise control devices.

In accordance with one aspect of the invention, there is provided a multi-layered real-time stereo matching system comprising:

a left and a right image acquisition means for obtaining a left and a right image on a spatial area from different position;

an image processing means for converting the left and the right image to a left and a right digital image; and a multi-layered image matching means for comparing one scan line in one of the left and the right digital image with multiple scan lines in the other of the left and the right digital image in real-time so that each pixel in the one scan line in one digital image matches another pixel in the multiple scan lines in the other digital image.

In accordance with anther aspect of the invention, there is provided a multi-layered real-time stereo matching method, the method comprising the steps of:

(a) obtaining a left and a right digital image on a spatial area;

(b) comparing one scan line in one digital image of the left and the right digital image with multiple scan lines in the other digital image in a real-time to match each pixel in the one scan line with a pixel in the multiple scan lines.

BRIEF DESCRIPTION OF THE DRAWINGS

The above and other objects and features of the present invention will become apparent from the following description of preferred embodiments, given in conjunction with the accompanying drawings, in which.

DETAILED DESCRIPTION OF THE PREFERRED EMBODIMENTS

A plurality of preferred embodiments of the present invention will be described in detail with reference to the accompanying drawings. Object, characteristics and advantages of the present invention will be apparently demonstrated through the preferred embodiments.

A multi-layered real-time stereo matching system using the systolic array in accordance with the present invention performs a high-speed parallel processing on images outputted from a pair of cameras and calculates locations of every object in three dimension. The system in accordance with the present invention provides a one-chip architecture for implementing a small-sized device that consumes less power and costs less by developing an algorithm optimized for the chip based on an ASIC-based chip development technology. As a result, the multi-layered real-time stereo matching system in accordance with the present invention can play a significant role as a recognition device.

In addition, the present invention provides a new architecture and algorithm capable of performing a real-time processing inside the chip that solves problems stemming from a poor calibration. In other words, even without precise control devices, the system is hardly affected by a camera installed imprecisely in location and direction thereof or a distortion of a camera lens. Accordingly, a manufacturing cost and a size of the system are reduced, thereby widening the application field of the present invention.

A conventional method for performing a stereo matching is used for searching pairs of corresponding pixels in a scan line of a right digital image and that of a left digital image. Meanwhile, a stereo matching method in accordance with the present invention provides an improved function in which corresponding points are searched by comparing one scan line of an image with multiple scan lines of another image in real-time. Thus, even though an epipolar line is not accurately located on a scan line in an actual image but is known to be only adjacent thereto, the corresponding points can be precisely discovered. In addition, it is possible to solve a problem in which there is no corresponding point on only a scan line due to an error of a camera lens or an inconsistency of inner parameters between cameras. In order to search the points corresponding to one scan line of an image, as many layers as the number of scan lines of another image are required. The layer includes a plurality of processing elements. Further, adjacent layers exchange signals so as to search optimized corresponding points between scan lines.

Figure 1:
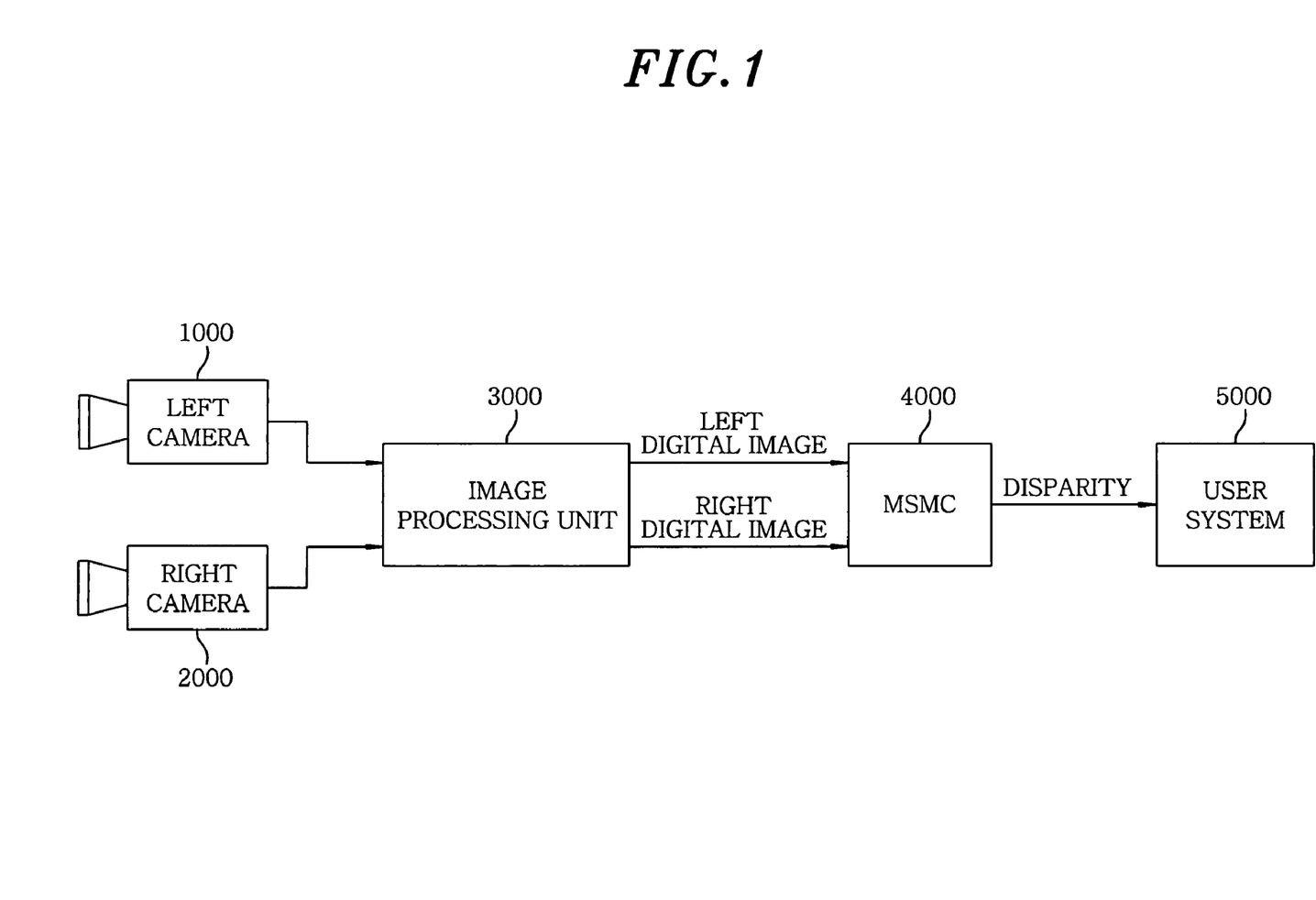
FIG. 1 shows a block diagram of a multi-layered real-time stereo matching system using a systolic array in accordance with the present invention.

FIG. 1 shows a multi-layered real-time stereo matching system using a systolic array in accordance with the present invention. The multi-layered real-time stereo matching system includes a left and a right camera 1000 and 2000 for capturing a left and a right image of a scene, respectively; an image processing unit 3000 for digitalizing the left and the right image into a left and a right digital image signal, respectively; a multi-layered stereo matching chip (MSMC) 4000 for calculating a disparity from the left and the right digital image signal, and a user system 5000 for displaying an image based on the disparity.

Figure 2:
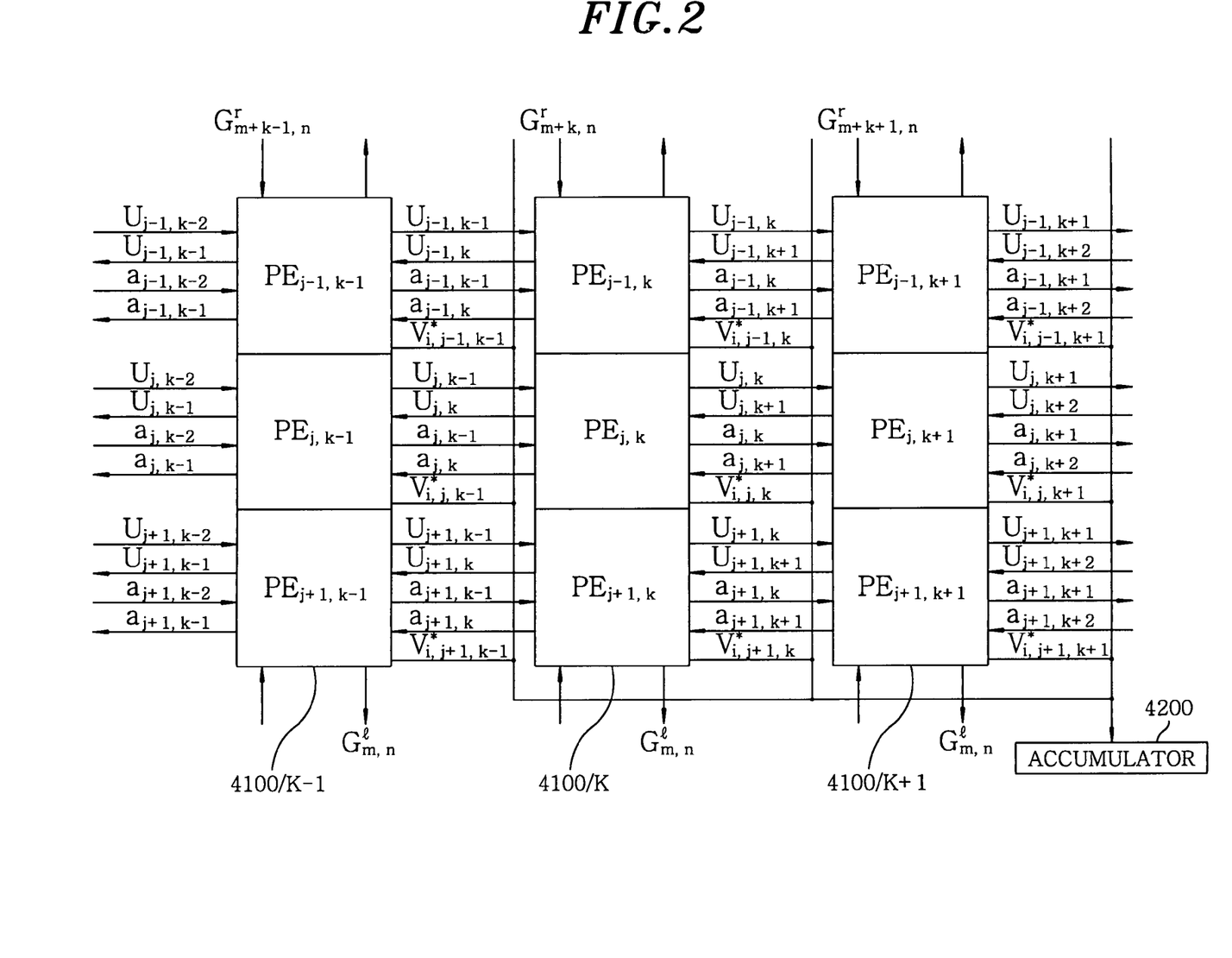
FIG. 2 illustrates a detail view of a multi-layered stereo matching chip (MSMC) shown in FIG. 1.

FIG. 2 shows a detailed view of the MSMC 4000 shown in FIG. 1. The MSMC 4000 includes a plurality of layers 4100/k−1, 4100/k and 4100/k+1 and an accumulator 4200 for accumulating data fed from the layers 4100/k−1, 4100/k and 4100/k+1 to obtain the disparity. One scan line is inputted from one digital image signal of the right and the left digital image signal into a portion of a top and a bottom portion of each of the layers 4100/k−1, 4100/k and 4100/k+1. At the same time, multiple scan lines from the other digital image signal are sequentially inputted into the other portion of the top and the bottom portion. Thus, when the multiple scan lines of the other digital image signal are searched to find another pixel corresponding to a pixel of the one scan line, the number of scan lines to be searched in the other digital image signal depends on the number of the layers 4100/k−1, 4100/k and 4100/k+1. Costs U and active signals A are transmitted between two adjacent layers of the layers 4100/k−1, 4100/k and 4100/k+1. The accumulator 4200 accumulates data fed from each of the layers 4100/k−1, 4100/k and 4100/k+1 and then outputs the disparity.

Figure 3:
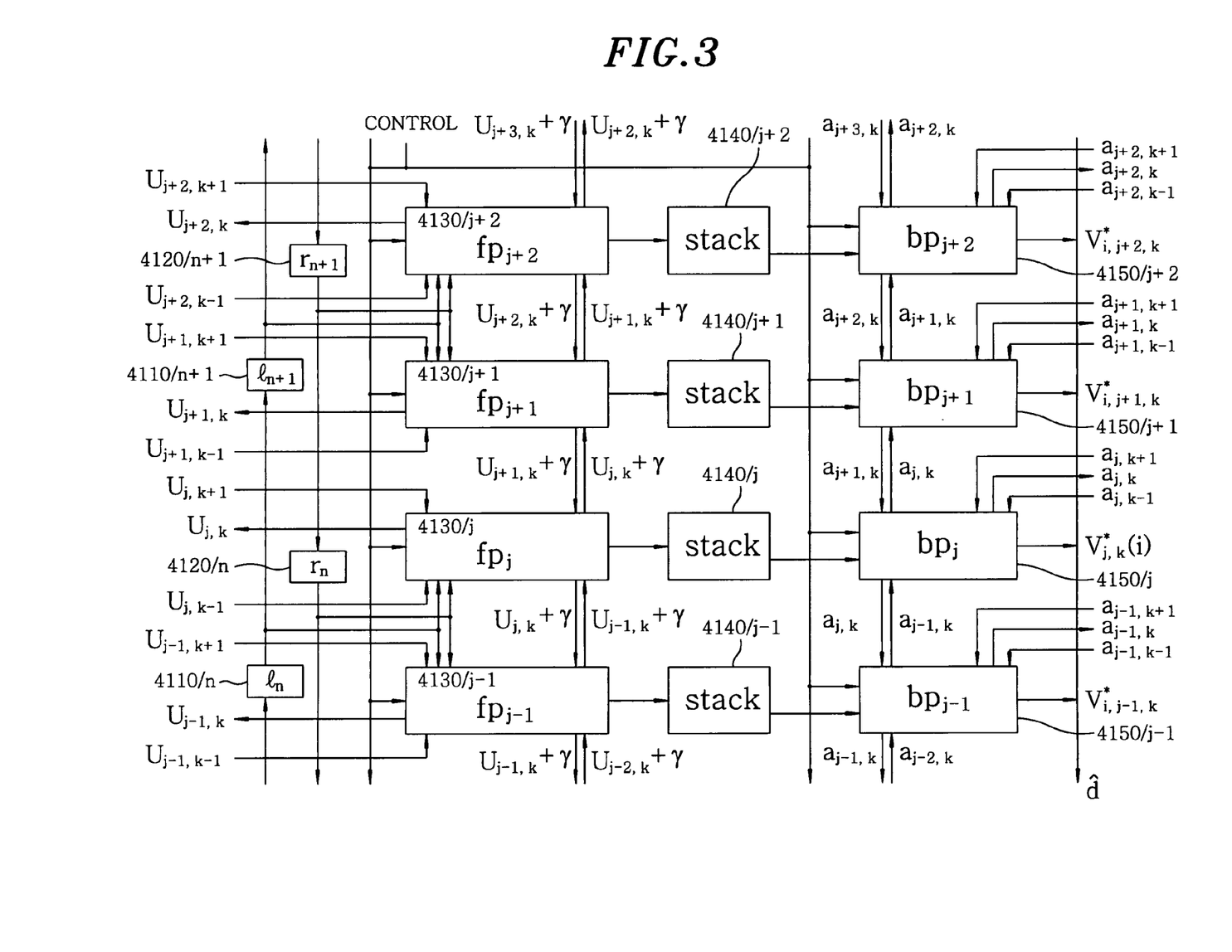
FIG. 3 presents a detailed view of a layer illustrated in FIG. 2.

FIG. 3 shows a detailed view of a k-th layer 4100/k shown in FIG. 2. The k-th layer 4100/k includes n/2 number of left image registers 4110/n and 4110/n+1; n/2 number of right image registers 4120/n and 4120/n+1; n number of forward processors 4130/j−1, 4130/j, 4130/j+1 and 4130/j+2; n number of stacks 4140/j−1, 4140/j, 4140/j+1 and 4140/j+2; and n number of backward processors 4150/j−1, 4150/j, 4150/j+1 and 4150/j+2. A forward processor, its stack and its backward processor may form a processing element. The left image registers 4110/n and 4110/n+1 and the right image registers 4120/n and 4120/n+1 store the left and the right digital image signal fed from the image processing unit 3000, respectively. The forward processors 4130/j−1, 4130/j, 4130/j+1 and 4130/j+2, the stacks 4140/j−1, 4140/j, 4140/j+1 and 4140/j+2 and the backward processors 4150/j−1, 4150/j, 4150/j+1 and 4150/j+2 calculate a decision value based on pixels of the right and left image registers 4110/n, 4110/n+1, 4120/n and 4120/n+1 in accordance with a clock signal and output the disparity.

Figure 4:
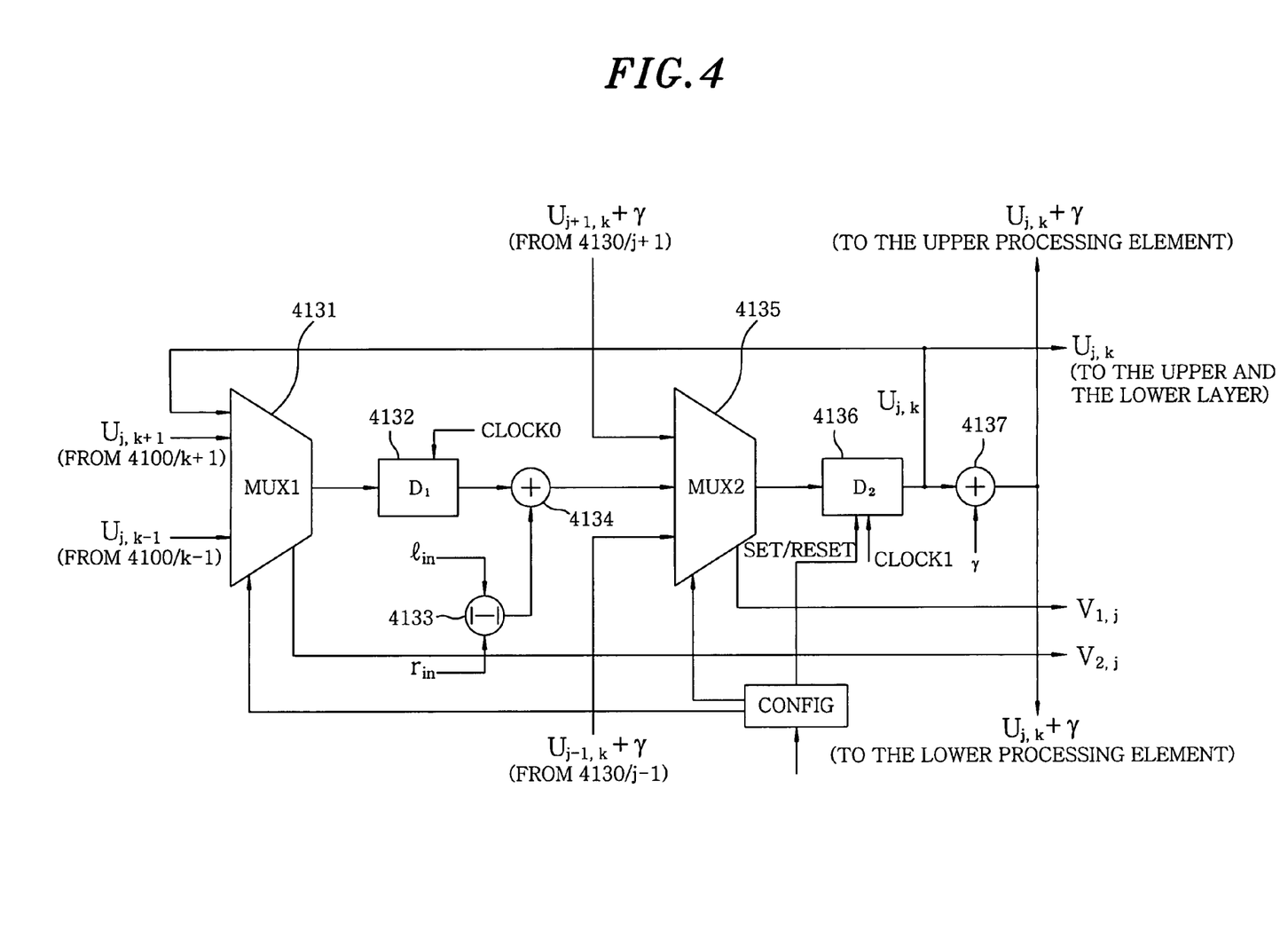
FIG. 4 provides a detailed view of a forward processor illustrated in FIG. 3.

FIG. 4 shows a detailed view of a j-th forward processor 4130/j of the k-th layer 4100/k shown in FIG. 3. The j-th forward processor 4130/j includes a first multiplexor (Mux1) 4131, a first cost register (D1) 4132, an absolute value calculator 4133, a first adder 4134, a second multiplexor (Mux2) 4135, a second cost register (D2) 4136, and a second adder 4137. The first multiplexor 4131 receives a recursive output from the second cost register 4136, a cost $U_{j,k-1}$ from a (k−1) st layer 4100/k−1 and another cost $U_{j,k+1}$ from a (k+1)st layer 4100/k+1 and determines as a first cost a minimum cost among the recursive output and the costs $U_{j,k-1}$ and $U_{j,k+1}$. The first cost register 4132 stores the first cost. The absolute value calculator 4133 calculates a matching cost as an absolute difference between a pixel $l_{in}$ in an n-th left image register 4110/n of the k-th layer 4100/k and another pixel $r_{in}$ of an n-th right image register 4120/n in the k-th layer 4100/k. The first adder 4134 adds the first cost to the matching cost. The second multiplexor 4135 receives an output of the first adder 4134, a cost $U_{j-1,k}+\gamma$ from a (j−1)st forward processor 4130/j−1 of the k-th layer and another cost $U_{j+1,k}+\gamma$ of a (j+1)st forward processor 4130/j+1 of the k-th layer, and selects as a second cost $U_{j,k}$ a minimum cost among the output of the first adder 4134 and the costs $U_{j-1,k}+\gamma$ and $U_{j+1,k}+\gamma$, wherein γ is occlusion information. The second cost register 4136 stores the second cost $U_{j,k}$. The second cost will be provided to the first multiplexor 4131 recursively. The second adder 4137 adds the second cost $U_{j,k}$ to the constant y, wherein the added cost $U_{j,k}+\gamma$ is provided to two adjacent forward processors 4130/j−1 and 4130/j+1 adjacent to the j-th forward processor 4130/j of the k-th layer.

Figure 5:
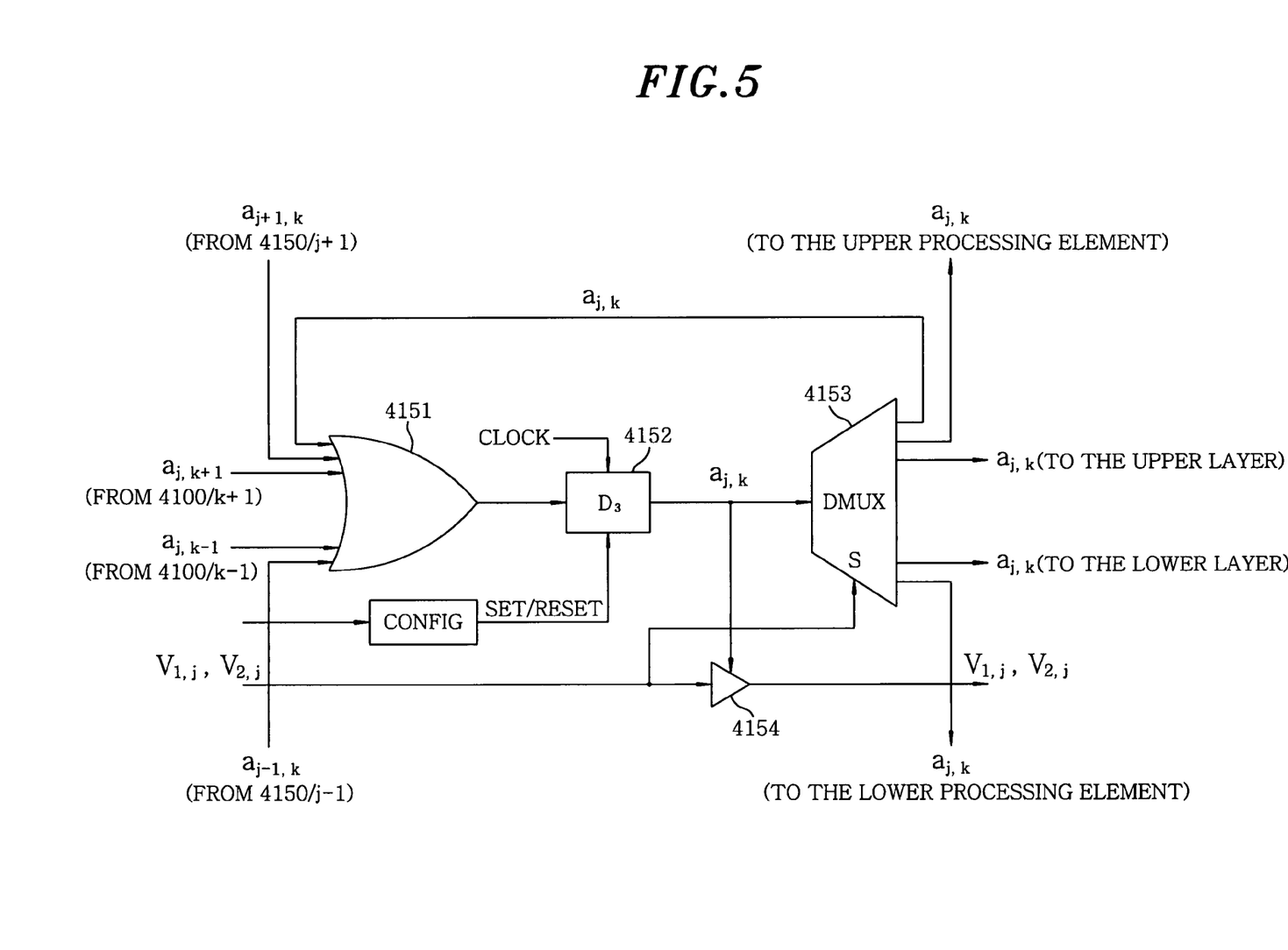
FIG. 5 offers a detailed view of a backward processor shown in FIG. 3.

FIG. 5 is a detailed view of a j-th backward processor 4150/j in the k-th layer 4100/k shown in FIG. 3. The j-th backward processor 4150/j includes an OR gate 4151, a one-bit activation register D3 4152, a demultiplexor 4153 and a tri-state buffer 4154. The OR gate 4151 receives five activation signals, i.e., two activation signals $a_{j,k-1}$ and $a_{j,k+1}$ fed from two j-th backward processors (not shown) of the (k−1)st and the (k+1)st layer 4100/k−1 and 4100/k+1, respectively; two activation signals $a_{j-1,k}$ and $a_{j+1,k}$ fed from a (j−1)st and a (j+1)st backward processors 4150/j−1 and 4150/j+1 of the k-th layer 4100/k, respectively; and a recursive activation signal $a_{j,k}$ fed from the demultiplexor 4153 of the j-th backward processor 4150/j in the k-th layer 4100/k, and performs an OR operation on the five activation signals. The one-bit activation register 4152 stores the output of the OR gate 4151. The demultiplexor 4153 transforms the output of the activation register 4152 based on two decision values $V_{1,j}$ and $V_{2,j}$ to generate a transformed output $a_{j,k}$. The transformed output $a_{j,k}$ of the demultiplexor 4153 is provided to the lower and the upper backward processor, i.e., (j−1)st and (j+1)st backward processor 4150/j−1 and 4150/j+1, of the k-th layer 4100/k, and two j-th backward processors of the lower and the upper layer, i.e., the (k−1)st and the (k+1)st layer. The transformed output $a_{j,k}$ is also fed back to the OR gate 4151, recursively. The tri-state buffer 4154 outputs the decision values $V_{1,j}$ and $V_{2,j}$ based on the output $a_{j,k}$ of the activation register 4152. If the tri-state register 4154 receives an input of "1", it outputs the input "1" and, if otherwise, the tri-state register 4154 turns to be a high impedance state so that there is no output.

Hereinafter, a real-time stereo matching method by using the multi-layered real-time stereo matching system with a systolic array in accordance with the present invention will be described in detail with reference to FIGS. 1 to 5.

If images of an object are obtained by the left and the right camera 1000 and 2000, the image processing unit 3000 transforms left and right analog images into left and right digital images, respectively, and outputs the left and the right digital images to the MSMC 4000.

The MSMC 4000 sequentially receives pixel data of one scan line in one of the left and the right digital images and pixel data of multiple scan lines in the other digital image, and performs an operation for calculating a disparity to output the disparity to the user system 5000. The process for outputting the disparity is repeated for all scan lines of the left and the right digital images.

A procedure in which the MSMC 4000 processes all scan lines of the left and the right digital image will now be described in detail.

The image registers 4110/n and 4120/n simultaneously receive pixel data of all scan lines of the left and the right digital images from the image processing unit 3000, respectively, and then provide the pixel data to the forward processor 4130/j.

The forward processor 4130/j sequentially receives the left and right digital images from the image registers 4110/n and 4120/n.

One forward processor 4130/j, one stack 4140/j, and one backward processor 4150/j are called as a processing element.

In k-th array, a plurality of identical processing elements may be arranged in a linear array, wherein the number of processing elements depends on a predetermined maximum disparity. Each processing element exchanges information with two adjacent processing elements, i.e., a lower and an upper processing element. If the processing elements are arranged as described above, they may be operated at a maximum speed regardless of the number of processing elements.

The image registers 4110/n and 4120/n and the processing element are controlled by inner clocks CLKE and CLK0. The inner clocks CLKE and CLK0 are obtained by dividing a system clock into two. The inner clock CLKE is toggled by a (2n)th system clock cycle, n being a positive integer, so that it is provided to the image register 4120/n for storing therein the right digital image. Meanwhile, the inner clock CLK0 is toggled by a (2n−1)st system clock cycle, n being a positive integer, so that it is provided to the image register 4110/n for storing therein the left digital image.

Further, each processing element is synchronized by the inner clocks.

On each system clock, the image registers 4110/n and 4120/n sequentially store the left and the right digital image, respectively. On each system clock, the forward processor 4130/j of the processing element is activated to calculate decision values from the left and the right digital image.

The backward processor 4150/j of the processing element determines disparities based on the decision values fed from the stack 4140/j and then calculates layer information corresponding to each disparity so that the disparities and the layer information are provided to the user system 5000. The layer information corresponding to each disparity indicates a layer 4100/k having an activated processing element. The layer information and the disparities are used to search a pair of pixels, the two corresponding to each other in the right and the left digital image, respectively. The disparity may be represented as one of an increment, no change and a decrement, for example, "+1", "0" and "−1". In another embodiment, the disparity may be represented as an accumulated disparity itself.

In the 0-th processing element, the first cost register 4132 of the forward processor 4130/j is initialized to be "0" while an activation register 4152 of the backward processor 4150/j is set to be "1".

On the other hand, in the k-th processing element, k being a positive integer, the cost register 4132 of the forward processor 4130/j is set to be a maximum cost while the activation register 4152 of the backward processor 4150/j is set to be "0".

The forward processor 4130/j processes a pair of scan lines, the two scan lines from the left and the right digital image, respectively, based on the clocks CLKE and CLK0 to calculate decision values $V_{1,j}$ and $V_{1,j}$. Then, the decision values $V_{1,j}$ and $V_{1,j}$ are stored in the stack 4140/j.

The backward processor 4150/j calculates the disparity based on the decision values fed from the stack 4140/j and then outputs the disparity based on the clocks.

The absolute value calculator 4133 of the forward processor 4130/j calculates a matching cost from an absolute difference between a pixel $r_{in}$ in the left image register 4110/n and another pixel $l_{in}$ in the right image register 4120/n. As shown in FIG. 2, the first multiplexor 4131 determines a minimum cost among data $U_{j,k-1}$ and $U_{j,k+1}$ provided respectively from two adjacent layers 4100/k−1 and 4100/k+1 and data $U_{j,k}$ fed back from the second cost register 4136 of the forward processor 4130/j. The first cost register 4132 stores the minimum cost. At the first adder 4134, the minimum cost stored in the first cost register 4132 is added to data of the absolute value calculator 4133. The second multiplexor 4135 determines a minimum cost among data $U_{j-1,k}+\gamma$ and $U_{j+1,k}+\gamma$ respectively provided from two adjacent processing elements in the same layer, i.e., k-th layer 4100/k, and data provided from the first adder 4134.

The backward processor 4150/j calculates an optimized disparity based on the decision values $V_{1j}$ and $V_{1j}$ fed from the stack 4140/j.

The OR gate 4151 of the backward processor 4150/j performs a logical sum operation, i.e., OR operation on five active bit paths. The five active bit paths are two active bit paths $a_{j+1,k}$ and $a_{j-1,k}$ respectively inputted from two adjacent backward processors 4150/j+1 and 4150/j−1 of two adjacent processing elements in the k-th layer, two active bit paths $a_{j,k+1}$ and $a_{j,k-1}$ inputted from two adjacent layers, respectively, and a feedback active bit path $a_{j,k}$. The OR gate 4151 outputs the logical sum to the activation register 4152.

A multiplicity of signals are selected as an output of the demultiplexor 4153 based on the decision values $V_{1j}$ and $V_{2j}$ fed from the stack 4140/j. Further, a value of the selected signal is equal to that of an active bit.

In case the active bit of the activation register 4152 is high, the tri-state buffer 4154 directly outputs the decision values $V_{1j}$ and $V_{2j}$. On the other hand, if the active bit of the activation register 4152 is in low, an output signal of the tri-state buffer 4154 is in an impedance state of high, so that outputs of two adjacent backward processors 4150/j−1 and 4150/j+1 of two adjacent processing elements are not interrupted. In addition, the accumulator can be used to output the disparity, instead of the decision values.

Hereinafter, a matching process of each pixel will be described as follows. Specifically, an m-th scan line of the left digital image is compared with multiple scan lines of the right digital image to find corresponding points in the multiple scan lines and the disparity is calculated.

$U_{j,k}(t)$ indicates a cost register value of a j-th forward processor 4130/j of a j-th processing element of a k-th layer 4100/k on clock t.

$l_{n,k}(t)$ and $r_{n,k}(t)$ represent values of the left and the right image register 4110/n and 4120/n of the k-th layer 4100/k on clock t, respectively.

$V_{1,j,k,t}$ and $V_{2,j,k,t}$ indicate decision values stored in the stack 4140/j from the j-th forward processor 4130/j of the j-th processing element of the k-th layer 4100/k on clock t, respectively.

$G_{n,m}^l$ and $G_{n,m}^r$ represent pixels in n-th pixels of the same horizontal lines, i.e., an m-th line of the left and the right digital image, respectively.

First, an initialization of a forward processing will be described as follows:

$n = \text{floor}(j/2), (0 \leq j < N)$ $N_h = \text{floor}(N/2)$

Every cost of all cost registers except for 0-th cost register is set to be a maximum cost.

$$U_{j,k}(0) = \begin{cases} 0 & \text{if } j = 0, \\ \infty & \text{otherwise} \end{cases}$$

Image data inputted to every left image register $r_{n,k}(t)$ in each of the layers as follows:

for $t = -N_h+1$ to 1 do:

$$r_{n,k}(t) = \begin{cases} G^r_{t+N_h-1, m+k-K}, & \text{if } n = N_h - 1 \\ r_{n+1,k}(t-1), & \text{otherwise} \end{cases}$$

wherein K indicates an offset that is appropriately predetermined for every scan line.

Second, the forward processing is operated as follows.

For each step i, each processing element determines a path having a minimum cost by using two adjacent processing elements' output data and then outputs a value of the determined path to the stack as follows:

For i=1 to 2N do:

if $t$ is even $$r_{n,k}(t/2) = \begin{cases} G^r_{t/2+N_h-1, m+k-K}, & \text{if } n = N_h - 1 \\ r_{n+1,k}(t/2-1), & \text{otherwise} \end{cases}$$

if $t$ is odd $$r_{n,k}((t+1)/2) = \begin{cases} G^r_{(t-1)/2, m}, & \text{if } n = 0 \\ l_{n-1,k}((t-1)/2-1), & \text{otherwise} \end{cases}$$

For each $j \in \{0, \ldots, N-1\}$:

if $i + j$ is even $$U_{j,k}(i) = \min_{p \in [-1,1], j+p \in [0, N-1]} U_{j+p,k}(i-1) + \gamma|p|,$$

$$V_{1,i,j,k} = \arg\min_{p \in [-1,1], j+p \in [0, N-1]} U_{j+p,k}(i-1) + \gamma|p|,$$

$$V_{2,i,j,k} = 0$$

if $i + j$ is odd $$U_{j,k}(i) = \left( \min_{q \in [-1,1], k+q \in [0, L_{MAX}-1]} U_{j,k+q}(i-1) \right) + \left| G^l_{\frac{1}{2}(i-j-1), m} - G^r_{\frac{1}{2}(i+j-1), m+k} \right|,$$

$$V_{1,i,j,k} = 0$$

$$V_{2,i,j,k} = \arg\min_{q \in [-1,1], k+q \in [0, L_{MAX}-1]} U_{j,k+q}(i-1),$$

wherein $L_{MAX}$ indicates a total number of layers. $\gamma$ indicates an occlusion cost which is a cost when a pixel in one digital image has no corresponding pixel in the other digital image. The occlusion cost $\gamma$ is determined by a parameter.

Third, an initialization process of a backward processing will be described as follows.

An optimized disparity value in the backward processing represents an activated processing element index.

Final costs of the forward processors of the 0-th processing elements in all the layers are compared with each other so that a layer $\hat{k}$' having a minimum cost is determined and a disparity is initialized with 0.

$\hat{d}_1(i)$ indicates a disparity outputted on an i step basis and $\hat{d}_2(i)$ represents a layer number indicating which layer has an activated processing element on the i step basis.

$$\hat{k}' = \arg \min_{k \in [0, L_{MAX}]} U_{0,k}(2N),$$

$$a(t', j, \hat{k}) = \begin{cases} 1, & \text{if } j = 0, \\ 0, & \text{otherwise} \end{cases}$$

Fourth, the backward processing will be described as follows.

The decision values $V_{1,j,k,t}$ and $V_{2,j,k,t}$ obtained by the forward processing are read out from the stack and, then, the optimized disparity $\hat{d}_1(i)$ and the layer number $\hat{d}_2(i)$ are calculated on a t step basis.

for $t' = 1$ to $2N$ do $$a(t', j, \hat{k}) = \sum_{p \in [-1,1], q \in [-1,1]} a(t'-1, j+p, k+q)$$

$$\delta(p + V_{1,2N-(t'-1),j+p,k}) * \delta(q + V_{2,2N-(t'-1),j,k+q}),$$

$$\hat{d}_{1,j,k}(t') = a(t', j, k) V_{1,2N-t',j,k},$$

$$\hat{d}_1(t') = \sum_{j \in [0,N-1], k \in [0,L_{MAX}-1]} \hat{d}_{1,j,k}(t'),$$

$$\hat{d}_{2,j,k}(t') = a(t', j, k) V_{2,2N-t',j,k},$$

$$\hat{d}_2(t') = \sum_{j \in [0,N-1], k \in [0,L_{MAX}-1]} \hat{d}_{2,j,k}(t')$$

Based on characteristics and implementation methods as described above, the forward and the backward processing are performed in parallel in all the processing elements.

Meanwhile, an algorithm for matching pixels will be described as follows.

$U_{j,k}(i)$ indicates a cost memory value in a forward processor of a j-th processing element of a k-th layer in an i-th clock.

$V_{1,j,k,i}$ and $V_{2,j,k,i}$ represent decision values stored into a stack from the forward processor of the j-th processing element of the k-th layer in the i-th clock.

$G_{n,m}^l$ and $G_{n,m}^r$ represent pixels of n-th pixels in the same line, e.g., an m-th line of the left and the right digital image, respectively.

First, an initialization process of a forward processing will be described as follows.

Every cost register except for a 0-th cost register is initialized to be infinite.

$$U_{j,k}(0) = \begin{cases} 0 & \text{if } j = 0, \\ \infty & \text{otherwise} \end{cases}$$

Second, the forward processing will be described as follows.

For each step i, a path having a minimum cost in each processing element based on two adjacent processing elements is determined and then the decision value of the path is provided to the stack.

For i=1 to 2N do:

For each $j \in \{0, \ldots, N-1\}$:

if $i + j$ is even $$U_{j,k}(i) = \min_{p \in [-1,1], j+p \in [0,N-1]} U_{j+p,k}(i-1) + \gamma p^2,$$

$$V_{1,i,j,k} = \arg \min_{p \in [-1,1], j+p \in [0,N-1]} U_{j+p,k}(i-1) + \gamma p^2,$$

$$V_{2,i,j,k} = 0$$

if $i + j$ is odd $$U_{j,k}(i) = \left( \min_{q \in [-1,1], k+q \in [0,N-1]} U_{j,k+q}(i-1) \right) +$$

$$\left( G_{\frac{1}{2}(i-j-1),m}^l - G_{\frac{1}{2}(i+j-1),m+k}^r \right)^2,$$

$$V_{1,i,j,k} = 0,$$

$$V_{2,i,j,k} = \arg \min_{q \in [-1,1], k+q \in [0,N-1]} U_{j,k+q}(i-1)$$

Third, a backward processing will be initialized as follows.

The costs of the forward processors of the 0-th processing elements of the layers between $L_{MIN}$ and $L_{MAX}$ are compared with each other so that a layer $\hat{k}'$ having a minimum cost is determined and the disparity is initialized with 0.

$$\hat{k}' = \arg \min_{k \in [L_{MIN}, L_{MAX}]} U_{0,k}(2N),$$

$$\hat{d}_1(2N) = 0,$$

$$\hat{d}_2(2N) = \hat{k}'$$

wherein $\hat{d}_1(i)$ indicates the disparity outputted on an i step basis and $\hat{d}_2(i)$ represents a layer number of the layer which has an activated processing element on the i step basis.

Fourth, the backward processing will be operated as follows.

The decision values $V_{1,j,k,t}$ and $V_{2,j,k,t}$ which are the results of the forward processing are read out from the stack to generate an optimized disparity $\hat{d}_1(i)$ and the layer number $\hat{d}_2(i)$ on a i step basis.

For i=2N to 1 do $$\hat{d}_1(i-1) = \hat{d}_1(i) + V_{1,i,\hat{d}_1(i),\hat{d}_2(i)},$$

$$\hat{d}_2(i-1) = \hat{d}_2(i) + V_{2,i,\hat{d}_1(i),\hat{d}_2(i)}$$

As described above, the present invention provides a multi-layered real-time stereo matching method and system, which is capable of obtaining three-dimensional distance and shape information on a space to be observed. Since the system is hardly affected by two cameras whose respective locations and directions are imprecisely fixed or a distortion of two camera lenses without precise control devices, a manufacturing cost and a size of the system can be reduced and, therefore, the present invention can be applied to various application fields as a small device.

Moreover, a point in one scan line of one digital image may correspond to another point in multiple scan lines of the other digital image in real-time. Thus, even though an epipolar line is not accurately located on a scan line in an actual digital image but is known to be adjacent thereto, a corresponding point can be found in the other digital image. In addition, it is possible to solve a problem in which there is no corresponding point on only a scan line due to an inconsistency of error rates of two camera lenses or an inconsistency of inner parameters between two cameras.

While the invention has been shown and described with respect to the preferred embodiments, it will be understood by those skilled in the art that various changes and modifications may be made without departing from the spirit and scope of the invention as defined in the following claims.

What is claimed is:

1. A multi-layered real-time stereo matching apparatus comprising:
    a left and a right image acquisition unit for obtaining a left and a right image of an object on a spatial area from different positions;
    an image processing unit for converting the left and the right image to a left and a right digital image; and
    a multi-layered image matching unit, which includes a systolic array, for comparing one scan line in one of the left and the right digital image with multiple scan lines in the other of the left and the right digital image in real-time by using the systolic array so that each pixel in the one scan line matches another pixel in the multiple scan lines in the other digital image,
    wherein the multi-layered image matching-unit receives pixels of the one scan line in the one digital image sequentially and receives pixels of the multiple scan lines in the other digital image at a time, and calculates a disparity between one pixel in the one scan line and said another pixel in the multiple scan lines,
    wherein the systolic array includes a plurality of layers for receiving pixel data of the one scan line in the one digital image and receiving pixel data of the multiple scan lines in the other digital image one by one, wherein two adjacent layers exchange costs and active signals with each other and the multi layered image matching unit further includes an accumulator for accumulating data fed from the layers to generate the disparity,
    wherein each of the layers has:
        a first storing unit for storing pixels of the left digital image;
        a second storing unit for storing pixels of the right digital image; and
        a plurality of forward processors, stacks and backward processors for generating decision values and the disparity obtained from the left and the right digital image based on a clock signal,
    wherein each of the backward processors of said each of the layers includes:
        an OR gate for logically summing two active bit paths inputted from an upper and a lower backward processor in said each of the layers, two active bit paths inputted from an upper and a lower layer of said each of the layers and a recursive active bit path within said each of the backward processors to generate a logical sum of five active bit paths;
        an activation register for storing the logical sum of five active bit paths;
        a demultiplexor for demultiplexing the logical sum of five active bit paths based on a decision value fed from the stack; and
        a tri-state buffer for outputting the decision value in case the logical sum of five active bit paths in the activation register is high, and
    wherein said left and right digital images are left and right images of said object, and wherein matching the pixel in the one scan line with another pixel in the multiple scan lines enables location of the object in said spatial area so that the imprecision in location and direction of, or distortion caused by, said left and right image acquisition unit is prevented.

2. The apparatus of claim 1, wherein an activation register of all layers of which 0-th backward processor has a minimum cost is initialized to be activated and all activation registers of other backward processors are initialized to be inactivated.

3. The apparatus of claim 1, wherein the backward processor accumulates the decision values fed from the tri-state buffer on a step basis to provide an optimized disparity and an optimized layer number.

4. The apparatus of claim 3, wherein the backward processor uses the layer number to search a scan line from multiple scan lines of the other digital image that corresponds to one scan line of the one digital image and uses the optimized disparity to search a pair of pixels, the two pixels corresponding to each other in the right and the left digital image on a backward processing step basis.

5. The apparatus of claim 3, wherein the backward processor initializes the disparity to be 0 on a layer basis and adds on a step basis to the disparity the decision values fed from a backward processor which is located in the layer corresponding to the layer number fed on a step basis during a backward processing and has a processing element number same as the disparity value.

6. The apparatus of claim 1, wherein the imprecision in location and direction of, or the distortion caused by, said left and right image acquisition unit is prevented even though said left and right image acquisition unit are arranged such that the one scan line and the multiple scan lines are not parallel.

* * * * *